April 1, 1969   A. L. BOMBERGER   3,436,135
BENDABLE THRUST BEARING RETAINER
Filed Aug. 16, 1967
FIG.1
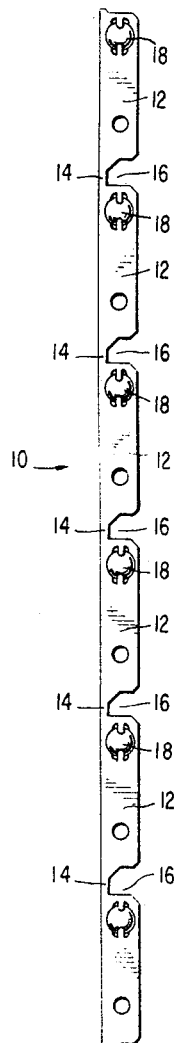
FIG.2
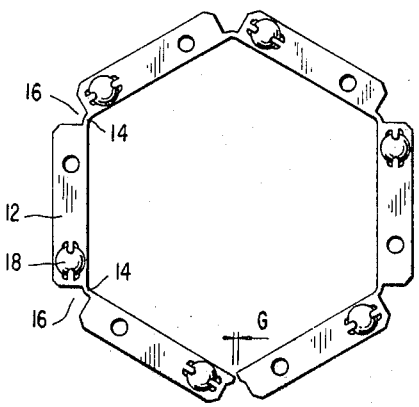
FIG.3A
FIG.3B
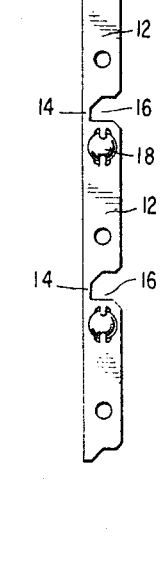
FIG.4A
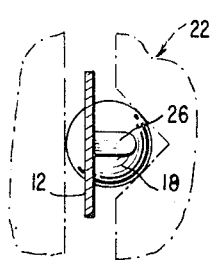
FIG.3C
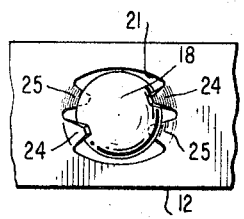
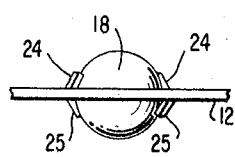
FIG.4B
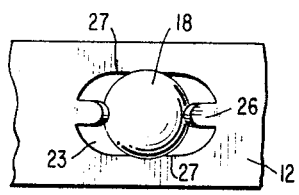
FIG.4C
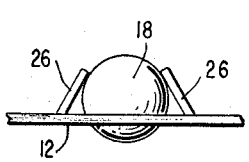
INVENTOR
ARTHUR L. BOMBERGER
BY Hughes, Rothwell, Mion, Zinn & Macpeak
ATTORNEYS United States Patent Office 3,436,135
Patented Apr. 1, 1969

3,436,135
BENDABLE THRUST BEARING RETAINER
Arthur L. Bomberger, Lancaster, Pa., assignor to National Bearings Company, Lancaster, Pa., a corporation of Delaware
Filed Aug. 16, 1967, Ser. No. 660,949
Int. Cl. F16c *19/20, 33/42*
U.S. Cl. 308—201                                    3 Claims

ABSTRACT OF THE DISCLOSURE

A bendable thrust bearing retainer is capable of being formed into a substantially circular shape of various sizes. The retainer includes a series of single ball containing planar link members integrally connected by deformable segments of reduced width formed by a notched area between successive links. The retainer may be shaped into a circular form in the plane of its links by bending the deformable segments and enlarging the notched areas which will be arranged around the outer periphery of the formed retainer.

---

This invention relates to an adjustable end-thrust bearing retainer which can be manufactured in continuous lengths from a light yet strong sheet metal or similar material. The bearing arrangement is originally produced in linear form and may, in fact, be used as a linear rather than circular thrust bearing arrangement. However, the structure is primarily designed to present a versatile light weight yet strong thrust bearing including a retainer capable of being formed into a substantially circular shape having a variable diameter dependent upon the particular application for which the bearing structure is used.

Antifriction bearing arrangements which may be formed into an end-thrust bearing having a circular shape are generally known. The majority of these known bearing arrangements, however, consist of a series of ball retaining receptacles connected together in chain-like fashion by flexible ligaments or the like. The link members of these prior art structures are primarily designed for ball retention features and do not perform the additional function of separating the ball bearings a desired predetermined distance from each other. In other words, the size of these links are varied only when the size of the bearing members are changed. Therefore, the known bearing arrangements are not designed to vary the spacings between the individual bearings by uniformly varying the size of the link members. An additional disadvantage of the known structures reside in their inability to place only a required number of ball bearings at evenly or predetermined spaced distances around the periphery of a circular end-thrust bearing.

The present invention overcomes the above disadvantages by providing a retainer having rigid rectangular ball retaining links integrally connected by deformable segments. Through the use of the present invention an adequate number of ball bearing member dependent upon the axial load to be supported may be evenly spaced at predetermined distances from one another while at the same time providing a retainer that may be readily adjusted to circular applications of various sizes. In addition, production and assembly of the present bearing structure is greatly simplified in that the retainer may be manufactured in a continuous one-piece planar strip of sheet metal or similar lightweight material.

The invention will be more fully described with reference to the acompanying drawings in which:

FIGURE 1 shows the bearing arrangement having the retainer in linear form;

FIGURE 2 shows the retainer in a substantially circular form;

FIGURES 3a through 3c show the ball bearings retained in the links for cooperation with a double grooved track;

FIGURES 4a through 4c show the ball bearing retained in the links for cooperation with a single grooved track.

A bearing structure 10 is shown in linear form in FIGURE 1 and includes a series of rigid planar rectangular link members 12 having a length of substantially greater dimension than their width. The links 12 are integrally connected by a deformable segment 14. As can be seen in the drawing, this segment 14 is substantially narrower than the link member 12 due to a notched area 16. A single ball bearing member 18 is retained in the transverse center and at one end of the link 12. The balls are loosely retained so that they may rotate freely with no binding or wedging.

Means to retain the balls in their respective link members generally includes pairs of prongs extending angularly upward from one face of link 12. The specific type of retaining means is dependent upon whether the bearing structure is adapted to travel in a double grooved raceway or track 20, FIGURE 3a, or a single grooved raceway 22, FIGURE 4a. When using the double grooved raceway it is necessary for equal portions of ball 18 to extend outwardly on each side of the link 12. Consequently, the ball is retained in aperture 21 having a width larger than the diameter of the ball. The ball is movably maintained in aperture 21 by two pairs of retaining prongs 24, 24 and 25, 25. The prongs forming a cooperating pair are diagonally opposed from each other and extend angularly upward from the same face of link 12. The prongs are integral with link 12.

When the bearing structure operates in a single grooved track 22 as shown in FIGURE 4a, an aperture 23 having a width somewhat less than the diameter of ball 18 is then provided in link 12. When assembled, a minor portion of the ball extends through aperture 23 and partially rests against aperture edges 27. The major portion of the ball extends outwardly from the opposite face of link 12, and is supported by a single pair of prongs 26 integral with and extending angularly upward from the same face of link 12.

The above two embodiments provide efficient and relatively simple means to retain the ball bearings 18 in their respective links 12 in a manner which eliminates binding and wedging of the balls during operation. In addition, this means of retention maintains the ease of producing and assembling the structure which is an important feature of this invention.

The retainer may be bent inwardly in the plane of the links and along the edge defined by segments 14 and the corresponding edge of links 12 into a substantially circular shape as shown in FIGURE 2. This is accomplished by deforming segments 14 and consequently enlarging the notched areas 16 now arranged around the outer periphery of the circular shaped retainer. The diameter of this circular shape may be varied. It may be made larger by enlarging gap G up to the length of one of the segments 14 and may be made smaller by having the ends of end segments abut, thereby eliminating the gap. The diameter of deformed circular shape may be reduced, to a certain extent, dependent upon the amount of deformation the segments 14 can withstand. The strength of segments 14 are dependent on the material of the links and size and shape of notches 16 which may be varied to suit a particular application.

Another structural feature of the present invention is the added strength obtained by retaining the ball 18 at one end of the link member relatively close to a deformable segment 14. This structural arrangement has the function of minimizing the bending moment about segment 14 at notch 16 from either tension or compression.

It should be emphasized that the specifications of the adjustable retainer may be widely varied and adapted to cooperate with large and small bearings adapted to support both heavy and light loads.

The present invention therefore presents an improved bearing structure and more specifically a thrust bearing retainer capable of being bent into a substantially circular form of various diameters while maintaining the load supporting ball bearings in accurate spaced relationship during operation. In addition, the retainer is produced from a single lightweight strip of thin metal or like sheet material and consequently may be simply and inexpensively manufactured and assembled.

What is claimed is:

1. A bendable thrust bearing retainer capable of being formed into a generally annular shape of various diameters comprising: a series of integrally connected generally planar rectangular link members each having a longitudinal dimension substantially greater than its transverse dimension, the planar links formed from thin sheet-like material and connected by integral deformable segments defined by notched areas with the adjacent longitudinal ends of successive link members, a ball bearing retained in nonbinding fashion in the transverse center and at one end of their respective links closest to the notched area and farthest from the retained ball of the next succeeding link, the construction being such that the retainer can be formed into a substantially circular shape in a plane defined by the planar link members by bending the deformable segments in a direction so as to arrange the notched areas along the outside periphery of the formed circular retainer.

2. A bendable thrust bearing retainer capable of being formed into a generally annular shape of various diameters as in claim 1 further comprising: a ball retaining aperture having a transverse dimension greater than the ball diameter located at one end of each link and a ball retained in the aperture by two pairs of prongs extending angularly outward from opposite faces of the planar link in such a manner as to allow equal portions of the ball to extend from opposite faces of the planar link.

3. A bendable thrust bearing retainer capable of being formed into a generally annular shape of various diameters as in claim 1 further comprising: a ball retaining aperture having a transverse dimension less than the ball diameter located at one end of each link, the ball movably retained in the aperture by edges of the aperture and a pair of prongs extending angularly outward from one face of the link in such a manner as to allow a major portion of the ball to extend outward from the same face of the link as the prongs.

References Cited

UNITED STATES PATENTS 2,566,421   9/1951   Lapointe _____ 308—235

MARTIN P. SCHWADRON, *Primary Examiner.*

FRANK SUSKO, *Assistant Examiner.*